Patented Sept. 30, 1952

2,612,493

UNITED STATES PATENT OFFICE 2,612,493

NONCONJUGATED HIGHER DIOLEFIN HOMOPOLYMERS

William J. Sparks and Robert M. Thomas, Westfield, N. J., assignors to Standard Oil Development Company, a corporation of Delaware No Drawing. Application October 3, 1951, Serial No. 249,638

7 Claims. (Cl. 260—94.2)

This invention relates to low temperature polymeric materials, and relates particularly to low temperature homopolymers of a certain class of higher diolefins.

It is known to produce rubber-like bodies by a variety of polymerization processes including the low-temperature polymerization of the isoolefins, particularly isobutylene, in the presence of minor amounts of various of the polyolefins by the application thereto of a dissolved Friedel Crafts catalyst, the preferred temperatures ranging from 0° C. to —100° C. or lower to —165° C. as disclosed in Patent 2,356,128; and it is known to produce rubber-like bodies from the diolefins alone by a polymerization in emulsion at or slightly above room temperature by the use of oxygen catalyst, or in mass reactions by the use of a variety of catalysts in the liquid olefinic material. However, attempts to polymerize butadiene, isoprene and dimethyl butadiene at low temperatures by the application of a Friedel Crafts catalyst have generally resulted only in powdery, brittle, insoluble polymers of little or no commercial utility; and the higher diolefins have been resistant to polymerization processes generally or at best produce oily products.

The present invention is based upon the discovery that polyolefins having more than 4 carbon atoms in a linear chain with one of the double linkages between the first and second carbon atoms, and a methyl substituent upon the second carbon atom, a similar structure at the other end, are responsive to a low temperature polymerization reaction utilizing a Friedel Crafts type catalyst, preferably in solution in a low-freezing, non-complex-forming solvent, to yield valuable solid polymers. The polyolefins utilized for this invention have the general formula:

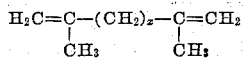

in which $x$ is an integer, the maximum value of which is unknown but probably above 20, and the preferred range from 1 to 6. Dimethallyl, also called di-isobutenyl, and the like, are particularly suitable polymerizable substances. Other materials of the present invention also are found in such substances as 2,4-dimethyl pentadiene-1,4 (where "$x$" in the formula is 1), and 2,9-dimethyl decadiene-1,9 (where "$x$" in the formula is 6). Accordingly, the invention polymerizes non-conjugated diolefins having an iso structure and more than 4 carbon atoms in the linear chain and having terminal isopropenyl groups.

The reaction is effected by the application of a Friedel Crafts catalyst such as aluminum chloride, in solution in a low-freezing, non-complex forming solvent such as ethyl or methyl chloride or carbon disulfide, or the like, to yield polymers which are reactive with sulfur in a typical vulcanization reaction to produce cured polymers of high tensile strength, good elongation and good flexure and abrasion resistance but varying if desired to lower molecular weight, high modulus or even brittle substances which are useful as such or in admixture with a wide range of other rubber-like or polymeric bodies to modify the modulus thereof, the processing characteristics and the wear properties, and to improve in many other respects the physical properties of the polymeric materials, and to make them applicable to the solving of specific structure problems. Other objects and details of the invention will be apparent from the following description:

In practising the present invention, the raw material is cooled to a temperature below about —20° C., preferably to a temperature between —25° C. and —100° C. or even as low as —150° C. or —164° C., either by the use of a refrigerating jacket upon the reactor, or, alternatively, by the direct admixture with the diolefin of such refrigerants as solid carbon dioxide, or liquid ethylene, or liquid ethane, or liquid methane, or the like. If desired, about ½ to 10, preferably 1 to 5, volumes of inert diluent or solvent may be added, e. g. butane, hexane, methyl chloride, ethyl chloride and the like. To the cold olefinic material there is then added a dissolved Friedel Crafts catalyst such as aluminum chloride dissolved in methyl chloride or ethyl chloride. The polymerization proceeds at good speed to yield the desired polymer. When a sufficient amount of the diolefin has polymerized into the desired product, the reaction mixture may be dumped into warm water or warm soda solution or other alkaline material to inactivate the catalyst and volatilize any residual olefinic material and refrigerant and to bring the polymer up to room temperature. The polymer may then be washed with further quantities of water as on the open mill, and then dried for further processing.

For the catalyst, any of the Friedel Crafts catalysts disclosed by N. O. Calloway in his article on "Friedel Crafts Synthesis" printed in the issue of "Chemical Review" published for the American Chemical Society at Baltimore in 1935, in volume XVII, No. 3, the article beginning on page 327, the list being particularly well shown on page 375, may be used, according to the type of material to be polymerized, the temperature at which the polymerization is conducted and the molecular weight desired in the finished polymer. For catalyst solvent, substantially any of the low boiling alkyl halides or haloparaffins may be used, whether they are mono or poly halides, provided their freezing point is below about 0° C. the essential requirement being a reasonably low-freezing point and the lack of complex-formation by the solvent with the Friedel Crafts compound (as shown by volatilization of the solvent away from the solute, to leave only the solute as residue).

It may be noted also that the gaseous Friedel Crafts type catalyst such as boron trifluoride are also usable but should be in solution in methyl chloride or other suitable solvent.

The resulting solid polymer may have a molecular weight within the range of 5,000 to 50,000, as determined by the Staudinger method.

The polymer may be compounded in a manner closely analogous to that used for compounding rubber, such substances as carbon black, stearic acid, zinc oxide, sulfur, and the usual vulcanization accelerators being suitable compounding agents. The compounding may be conducted on the open roll mill and the curing may be conducted under conditions of heat and pressure in a manner closely analogous to that utilized for rubber to yield a material of good tensile strength. Alternatively, the material by suitable modifications in the polymerization process and suitable modification of the compounding recipe may be utilized for the formation of films, either rubber-like or leathery, or for the making of leathery to hard molded objects. Alternatively, since the material is thermoplasic it may be used for the making of molded articles without a curing reaction.

This application is a continuation-in-part of application Ser. No. 409,054 filed June 8, 1943, now abandoned, which is a continuation-in-part of application Ser. No. 310,341 filed December 21, 1939, now Patent No. 2,322,073.

*Example 1*

A mixture was prepared consisting of 100 parts by weight of dimethallyl, 200 parts by weight (or about 1.4 vol.) of methyl chloride, and approximately 400 parts by weight of crushed solid carbon dioxide. When the temperature of the mixture had fallen to about −75° C., approximately 5 parts of a catalyst consisting of 0.8% of aluminum chloride dissolved in methyl chloride were added to the mixture with vigorous stirring. The polymerization was substantially complete within a very few minutes to yield a heavy viscous solution. The polymer was precipitated from this solution by the addition of isopropyl alcohol. Upon warning up the material to volatilize the refrigerant, traces of methyl chloride, traces of unpolymerized dimethallyl and traces of isopropyl alcohol, a clear water-white transparent solid polymer was obtained, which also was soluble in hydrocarbon solvents generally and reactive with sulfur in a typical curing reaction.

*Example 2*

A mixture of dimethallyl with an equal volume of methyl chloride was prepared and cooled to −78° C. by the application of an excess of solid carbon dioxide and treated with a chilled solution of aluminum chloride in methyl chloride containing about 0.5% $AlCl_3$. A polymeric precipitate appeared promptly which was found to be non-brittle, but relatively non-elastic. The polymer was somewhat plastic and flexible, but not particularly rubbery in general characteristics.

These polymers may be compounded with a wide variety of substances, such as carbon black, zinc oxide, stearic acid, lithopone, clay barytes, ferric oxide, chromic oxide, wood flour, cellulosic materials generally, and similar inert substances as well as with sulfur and sulfo-genetic substances.

These materials are useful as rubber-like bodies of high modulus, either in "pure gum form" when cured with or in the usual rubber compounding formulae. They are reactive directively with sulfur, because of the high unsaturation, and the reaction is markedly facilitated and speeded by the use of various of the ordinary vulcanization accelerators used with natural rubber. The materials are particularly valuable for compounding with other rubber-like materials either as extenders or as modifiers. They are particularly useful as plasticizers for polybutadiene, especially the copolymer of butadiene with styrene or with acrylonitrile. They are useful as compounding agents with the copolymer of isobutylene with a diolefin such as butadiene, isoprene, piperylene, dimethyl butadiene, and the like, produced at low temperature, since small amounts very substantially increase the modulus of the cured copolymer.

It will be noted that the raw material for this polymerization reaction must have at least 5 carbon atoms in the linear chain of the molecule and an aliphatic substituent on the second carbond atom. The maximum number of carbon atoms permissible in the molecule is as yet undetermined but the present indications are that the limit lies above 16 carbon atoms and a suitable olefin may be selected from the list of compounds having from five to sixteen carbon atoms per molecule.

Because of the high unsaturation of this material, as indicated by an iodine number ranging from 200 to 350, depending upon the particular diolefin chosen, the properties are more like those of natural rubber and the material is not only reactive with sulfur in a typical vulcanization reaction, but it is also reactive with elemental chlorine; with hydrogen chloride and with sulfur chloride.

Thus the invention provides a new rubber-like polymer of certain higher diolefins prepared by a low temperature polymerization reaction with a catalyst in the form of a Friedel Crafts type catalyst either as such or in solution in a low-freezing non-complex-forming solvent.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

What is claimed is:

1. The process which comprises essentially homopolymerizing a non-conjugated diolefin of 7 to 26 carbon atoms having terminal isopropenyl groups, at a temperature of about −20° C. to −164° C., in the presence of a Friedel Crafts catalyst.

2. The process for making high molecular weight solid hydrocarbon polymers, which comprises essentially subjecting to polymerization a reactant consisting essentially of a diolefin having the general formula $$H_2C=(CH_3)C-(CH_2)_x-C(CH_3)=CH_2$$

where $x$ is 1 to 20, at $-20°$ to $-164°$ C., in the presence of a Friedel Crafts catalyst dissolved in an inert solvent.

3. Process according to claim 2 in which $x$ is 1 to 6.

4. The process for preparing an elastic curable polymer from a single monomer, comprising the steps in combination of cooling dimethallyl to a temperature within the range between $-20°$ C. and $-100°$ C., and adding thereto at that temperature a Friedel Crafts active metal halide catalyst in solution in a halogen substituted aliphatic compound liquid at said polymerization temperature.

5. The process for preparing high molecular weight solid plastic flexible vulcanizable high unsaturation synthetic hydrocarbon polymers which consists essentially in subjecting dimethallyl to polymerization in the presence of about 1 to 1½ volumes of methyl chloride at a temperature at least as low as $-75°$ C., using as catalyst a solution of aluminum chloride dissolved in methyl chloride.

6. A product consisting essentially of a solid vulcanizable flexible plastic synthetic hydrocarbon polymer of a diolefin having the general formula $$H_2C=(CH_3)C-(CH_2)_x-C(CH_3)=CH_2$$

where $x$ is 1 to 20.

7. A product consisting essentially of a high molecular weight solid flexible plastic synthetic hydrocarbon polymer of dimethallyl, said polymer having an unsaturation of about 200–350, and being vulcanizable.

WILLIAM J. SPARKS.
ROBERT M. THOMAS.

No references cited.